US006742887B2

(12) United States Patent
Ando

(10) Patent No.: US 6,742,887 B2
(45) Date of Patent: Jun. 1, 2004

(54) PORTABLE ELECTRONIC DEVICE WITH PRINTING MECHANISM

(75) Inventor: Masahiro Ando, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/159,033

(22) Filed: Jun. 3, 2002

(65) Prior Publication Data

US 2002/0186293 A1 Dec. 12, 2002

(30) Foreign Application Priority Data

Jun. 11, 2001 (JP) ....................................... 2001-175331
May 24, 2002 (JP) ....................................... 2002-150054

(51) Int. Cl.$^{7}$ ............................... B41J 3/00; B41J 3/36; B41J 29/00; H04M 11/00; H04M 1/38

(52) U.S. Cl. ............................. 347/109; 347/2; 347/85; 347/108; 455/73; 455/407; 455/556; 455/557; 400/88; 400/717

(58) Field of Search ................................ 455/556, 557, 455/407, 73; 347/2, 109, 85, 108; 400/88, 717

(56) References Cited

U.S. PATENT DOCUMENTS

| | | | | | |
|---|---|---|---|---|---|
| 5,110,226 | A | * | 5/1992 | Sherman et al. | 400/88 |
| 5,240,334 | A | * | 8/1993 | Epstein et al. | 400/88 |
| 5,444,192 | A | * | 8/1995 | Shetye et al. | 178/18.09 |
| 5,446,783 | A | * | 8/1995 | May | 455/557 |
| 5,447,442 | A | * | 9/1995 | Swart | 439/77 |
| 5,501,535 | A | * | 3/1996 | Hastings et al. | 400/88 |
| 5,542,487 | A | * | 8/1996 | Schultz et al. | 178/4.1 A |
| 5,593,236 | A | * | 1/1997 | Bobry | 400/88 |
| 5,802,420 | A | * | 9/1998 | Garr et al. | 399/27 |
| 5,848,401 | A | * | 12/1998 | Goldberg et al. | 705/408 |
| 6,091,514 | A | * | 7/2000 | Hasegawa et al. | 358/296 |
| 6,119,931 | A | * | 9/2000 | Novogrod | 235/379 |
| 6,219,227 | B1 | * | 4/2001 | Trane | 361/683 |
| 6,241,351 | B1 | * | 6/2001 | Stephenson | 347/109 |
| 6,290,349 | B1 | * | 9/2001 | Silverbrook et al. | 347/87 |
| 6,312,124 | B1 | * | 11/2001 | Desormeaux | 347/109 |
| 6,326,097 | B1 | * | 12/2001 | Hockaday | 429/34 |
| 6,360,174 | B1 | * | 3/2002 | Shoki | 702/55 |
| 6,405,055 | B1 | * | 6/2002 | Silverbrook et al. | 455/556 |
| 6,417,913 | B2 | * | 7/2002 | Tanaka | 355/39 |
| 6,439,706 | B1 | * | 8/2002 | Silverbrook et al. | 347/86 |
| 6,467,688 | B1 | * | 10/2002 | Goldman et al. | 235/472.01 |
| 6,478,415 | B2 | * | 11/2002 | Barinaga et al. | 347/85 |
| 6,523,933 | B1 | * | 2/2003 | Hirano et al. | 347/36 |
| 6,628,430 | B1 | * | 9/2003 | Silverbrook et al. | 358/473 |

FOREIGN PATENT DOCUMENTS

| | | | | | |
|---|---|---|---|---|---|
| JP | 5-153220 | | | 6/1993 | |
| JP | 11-320977 | | | 11/1999 | |
| JP | 2001253137 | A | * | 9/2001 | B41J/29/00 |
| JP | 2002273862 | A | * | 9/2002 | B41J/2/01 |
| WO | WO 3069931 | A1 | * | 8/2003 | H04Q/7/32 |

* cited by examiner

*Primary Examiner*—Stephen D. Meier
*Assistant Examiner*—Leonard Liang
(74) *Attorney, Agent, or Firm*—Fitzpatrick, Cella, Harper & Scinto

(57) ABSTRACT

The invention provides a portable communication apparatus capable of minimizing the ink tank incorporated therein and easily and simply printing the data stored therein even while it is carried. For this purpose there is disclosed a configuration incorporating a printing mechanism and adapted to execute ink filling and waste ink collection for the printing mechanism at the battery charging operation of the portable communication apparatus.

9 Claims, 11 Drawing Sheets

PORTABLE ELECTRONIC DEVICE WITH PRINTING MECHANISM

BACKGROUND OF THE INVENTION

1. Field of the Invention

The present invention relates to a portable electronic device with a printing mechanism, and more particularly to a portable electronic device with a printing mechanism enabling filling of the printing ink and/or disposal of the waste ink at the battery charging of a device operable with a rechargeable battery such as a portable telephone.

2. Related Background Art

For portable electronic devices such as a portable telephone or PDA, the environment is now being arranged for such devices to be used for conversational communication, schedule management, viewing of the home pages (color images) on the internet, transmission and reception of an electronic mail including characters and color images, and transmission and reception of an electrophotographic image taken with a digital camera equipped on the portable electronic device.

The Japanese Patent Application Laid-open No. 5-153220 discloses a technology of reading a printed telephone number and automatically making a telephone call based on thus read telephone number, and the Japanese Patent Application Laid-open No. 11-320977 discloses a printer capable of printing characters and symbols based on character data or voice data transmitted from a portable telephone. As represented by these examples, the portable electronic devices have the possibility of expansion in their applications and executable functions.

However, for printing the image or the like of the portable telephone, there is being currently required a cumbersome procedure of transmitting the image data to a large-scale computer of a provider by the internet, and, after returning to home, accessing the large-scale computer to which the image data have been transmitted and downloading and printing the image data in the computer at home.

On the other hand, the display unit of the portable electronic device such as portable telephone is becoming color capable, and, parallel to such trend, the opportunity of handling color images is also increasing in the portable communication apparatus such as a portable telephone such as the introduction of a model of a portable telephone equipped with a digital camera, the exchange of images with the counterpart of conversation by attaching a color image to the electronic mail, and the viewing of home pages on the internet.

The requirement for printing such color image on the spot is strong and is expected to further increase in the future, but such requirement for printing on the spot cannot be met at present, because only a relatively large apparatus is available for printing.

Even in contemplating a configuration incorporating a printing mechanism in the portable telephone, because the compactness of the portable telephone itself is essential and the bulkiness of the device by the inclusion of the printing mechanism is undesirable, it is required that the entire printing configuration including the printing mechanism is required to be compact. Consequently the ink tank, which is a constituent of the printing mechanism, has to be minimized and the printable number of sheets is therefore limited to a certain extent. It is however desirable to avoid a situation where the ink is exhausted before the desired printing is completed because of the excessively small ink tank.

SUMMARY OF THE INVENTION

The present invention, attained in consideration of the aforementioned technical drawbacks, is based on the fact that the portable electronic device usually employs a rechargeable battery as the power source and is charged at a certain timing and is featured by the fact of executing ink filling and collection of waste ink for the printing mechanism, that cannot hold a large amount of ink, of the electronic device, utilizing the timing of battery charging of such electronic device. It is also possible to match the timing of ink filling and collection of waste ink with the timing of battery charging by filling the ink in such an amount that printing can be carried out with the battery capacity of the portable electronic device, thereby avoiding an unnecessary increase in the ink capacity and an increase in the dimension of the printing mechanism.

An object of the present invention is to provide a portable communication apparatus capable of compactizing the ink reservoir therein and enabling to easily incorporate a printing mechanism in the portable communication apparatus such as a portable telephone, thereby enabling to easily and promptly printing the data stored therein.

Another object of the present invention is to provide a portable printing apparatus allowing to minimize the ink tank incorporated in the portable communication apparatus and enabling to easily and simply print the data stored in the portable communication apparatus on the spot even while it is carried.

According to the present invention, in a portable telephone incorporating a printing apparatus, ink filling and discharge of waste ink are simultaneously performed with the battery charging of the power supply, or it is performed to insert a separate ink filling tank for example into the lower part of the portable telephone for filling ink when the amount of the ink in the portable telephone is lowered and discharging the waste ink held therein, thereby minimizing the size of the ink tank of the printing apparatus incorporated in the portable telephone. It is also possible to simply print the image contained in the portable telephone, since the printing apparatus is incorporated therein.

Still another object of the present invention is to provide a portable electronic device system including a portable electronic device provided with a rechargeable battery and a charging apparatus provided with a charging mechanism for charging the battery of the portable electronic device, wherein the portable electronic device incorporates an ink jet printing mechanism, and the charging apparatus includes an ink filling mechanism for filling ink to the printing mechanism of the portable electronic device and a collection mechanism for the waste ink discharged from the printing mechanism of the portable electronic device.

Still another object of the present invention is to provide a portable electronic device provided with a rechargeable battery, comprising an ink jet printing mechanism including an ink jet head and a conveying mechanism for recording media, and an ink filling coupling portion and a waste ink coupling portion to be respectively connected with an ink filling mechanism and a waste ink collection mechanism provided in a charging apparatus to be mounted for battery charging.

Still another object of the present invention is to provide a charging apparatus provided with a charging mechanism for charging a battery of a portable electronic device provided with a rechargeable battery, wherein the portable electronic device incorporates an ink jet printing mechanism, and the charging apparatus comprises an ink filling mechanism for filling ink to the printing mechanism and a waste ink collection mechanism for waste ink discharged from the printing mechanism of the portable electronic device.

DETAILED DESCRIPTION OF THE PREFERRED EMBODIMENTS

Now the present invention will be clarified in detail by an embodiment thereof with reference to the accompanying drawings, the same or equivalent parts are represented by the same number.

Figure 1:
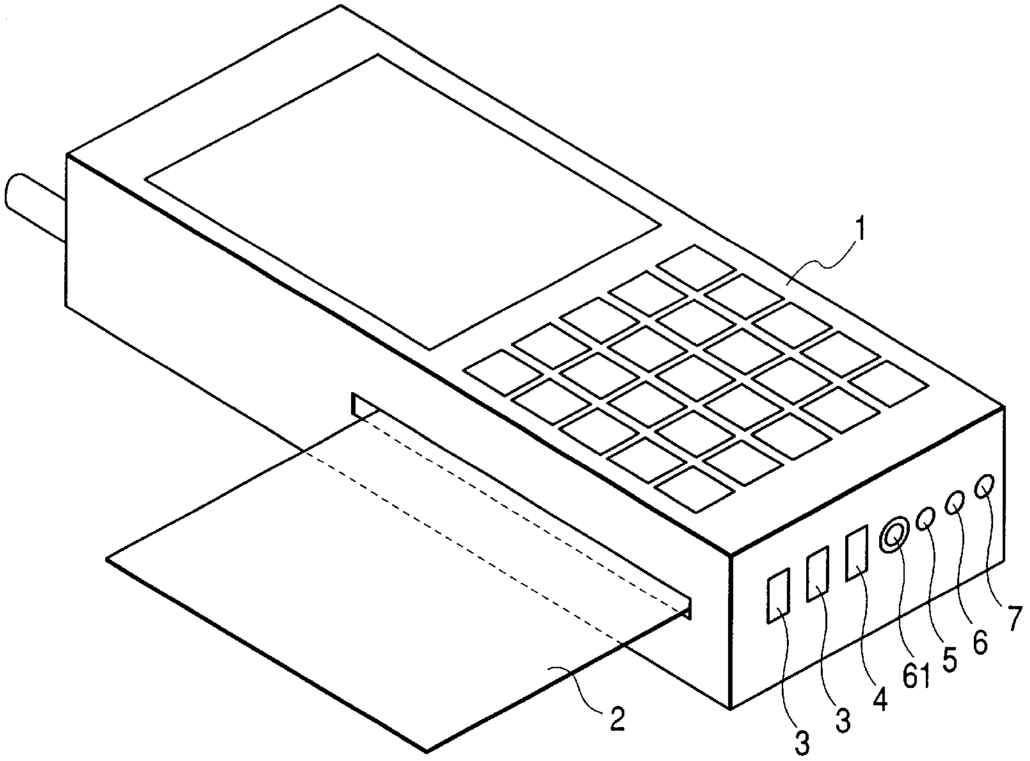
FIG. 1 is a schematic perspective view showing an embodiment of the portable communication apparatus incorporating a printing mechanism of the present invention.

FIG. 1 is a schematic perspective view showing an embodiment of a portable communication apparatus incorporating a printing mechanism of the present invention. Referring to FIG. 1, there are shown a portable communication apparatus 1 such as a portable telephone, incorporating a printing mechanism, a recording medium 2 such as recording sheets for printing by the printing mechanism of the portable communication apparatus, power supply terminals 3, 3 for charging the portable communication apparatus 1, and a communication terminal 4 for transmitting charging information or ink information of the portable communication apparatus 1.

In the present embodiment, the aforementioned portable communication apparatus 1 is composed of a portable telephone provided with information processing function. The illustrated portable communication apparatus 1 constitutes a portable telephone capable of printing a color image, in which provided are a magenta ink terminal 5, a cyan ink terminal 6 and a yellow ink terminal 7 respectively for the supply of a magenta, cyan and yellow inks to the portable communication apparatus 1, and a waste ink terminal 61 for discharging the waste ink from the portable electronic apparatus.

Figure 2:
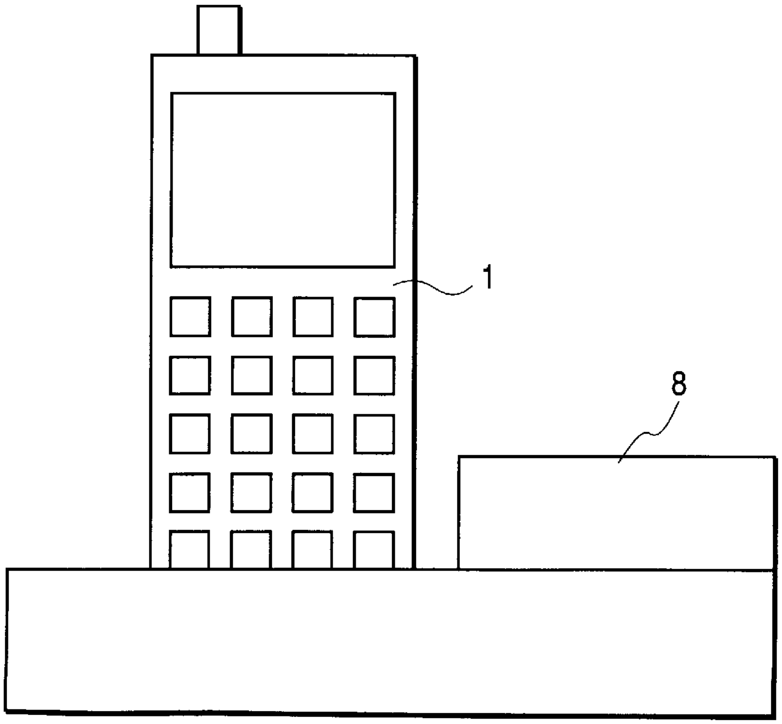
FIG. 2 is a schematic elevation view showing a state in which the portable communication apparatus shown in FIG. 1 is charged by mounting on a charging/ink-filling apparatus.

FIG. 2 shows a portable telephone as an example of the portable electronic device incorporating the printing mechanism, and a schematic elevation view showing a state in which the portable telephone 1 is mounted on a charging/ink-filling/waste ink collection apparatus (hereinafter called charging/ink filling and collection apparatus) 8.

Figure 4:
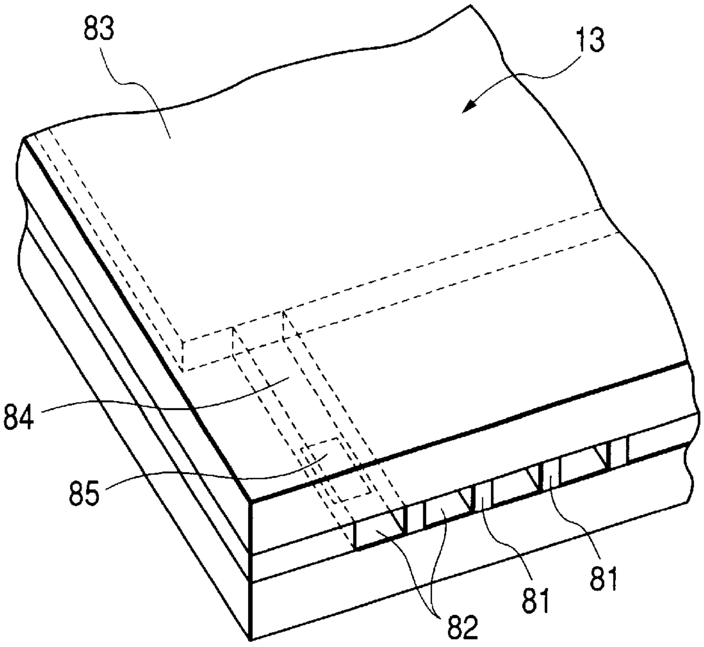
FIG. 4 is a partial perspective view schematically showing the configuration of an ink discharge portion of a printing head shown in FIG. 3.

By mounting (inserting) the portable telephone 1 in a predetermined portion of the charging/ink filling and collection apparatus, the power supply terminal 3, ink terminals 5, 6, 7 and waste ink terminal 61 of the portable telephone 1 are respectively connected with corresponding terminals provided on the charging/ink-filling apparatus as shown in FIG. 4, whereby the battery charging, ink filling and waste ink collection are executed simultaneously.

Figure 3:
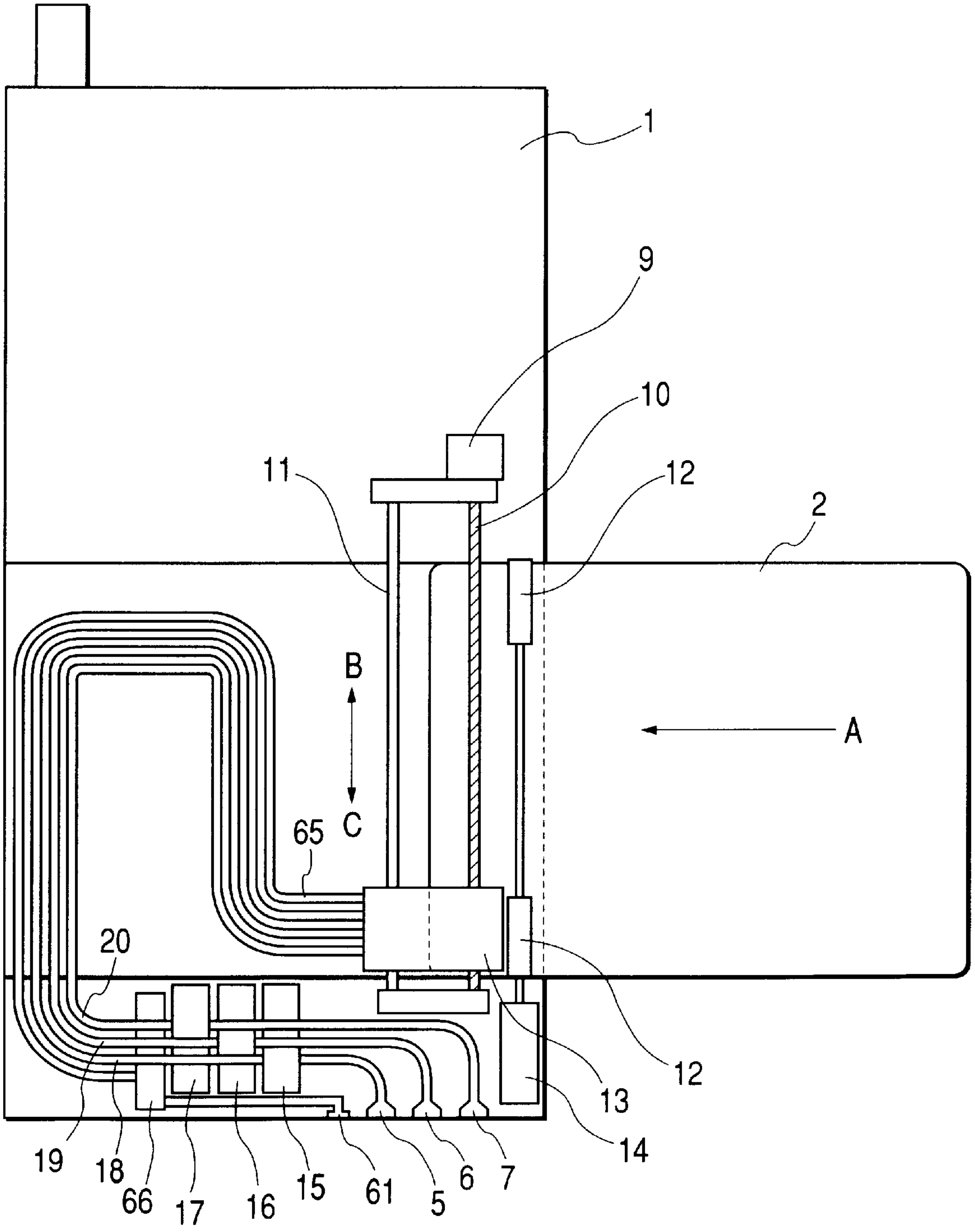
FIG. 3 is a schematic partially cut-off elevation view showing the configuration of the printing mechanism of the portable communication apparatus shown in FIG. 1.

FIG. 3 is a schematic plan view schematically showing a printing mechanism provided in the portable telephone 1 shown in FIG. 1.

Referring to FIG. 3, there are shown a printing motor 9 for moving a printing head 13, a head moving screw rod 10 for moving the printing head 13, a sheet conveying roller 12 for conveying a recording sheet 2, a printing head guide 11 for guiding the movement of the printing head 13, a printing head 13 for printing on the recording sheet 2, a sheet conveying motor 14 directly coupled with the sheet conveying roller 12 and serving to control the rotation thereof, a magenta ink tank 15 provided between a magenta ink terminal 5 and the printing head 13, a cyan ink tank 16 provided between a cyan ink terminal 6 and the printing head 13, a yellow ink tank 17 provided between a yellow ink terminal 7 and the printing head 13, a magenta ink tube 18 connecting the magenta ink tank 15 and the printing head 13, a cyan ink tube 19 connecting the cyan ink tank 16 and the printing head 13, a yellow ink tube 20 connecting the yellow ink tank 17 and the printing head 13, a waste ink terminal 61 for discharging the waste ink, a waste ink tube 65 for discharging the waste ink, and a waste ink tank 66.

The printing sheet 2 inserted as the recording medium in the printing medium of the portable telephone 1 is conveyed in a direction A by the sheet conveying roller (conveying roller) 12 driven by the sheet conveying motor 14. In the illustrated example, the sheet conveying roller 12 is directly connected to the sheet conveying motor 14 and is controlled by the rotation of the sheet conveying motor. The aforementioned printing head 13 is driven based on the image information of the portable communication apparatus 1 and in synchronization with the movement and position control of the printing head 13 by the printing motor 9 in directions B, C (main scanning) to record an image on the printing (recording) sheet 2, and, upon completion of the printing (recording) of a line, the recording (printing) operation is temporarily interrupted and the sheet conveying motor 12 is rotated to convey the sheet (sub scanning) in the direction A by a predetermined length (predetermined pitch) for recording a next line. The printing (recording) is executed on the entire printing sheet 2 by repeating such recording operation and sheet conveying operation.

The aforementioned printing head 13 constituting the recording (printing) means is an ink jet head for discharging ink utilizing thermal energy, and is provided with an electrothermal converting member for generating thermal energy. The ink jet head 13 is so constructed as to generate film boiling in the ink by thermal energy applied by the electrothermal converting member, and to discharge ink from the discharge port utilizing pressure changes resulting from growth and contraction of a bubble generated by such film boiling, thereby executing recording (printing).

FIG. 4 is a partial perspective view schematically showing the configuration of an ink discharge portion of the printing head 13. Referring to FIG. 4, a discharge port face 81 opposed to the recording medium 2 such as the printing (recording) sheet with a predetermined gap (for example about 0.2 to 2.0 mm) is provided with plural discharge ports 82 with a predetermined pitch, and an electrothermal converting member (heat generating resistor or the like) 85 for generating discharging energy is provided along a wall of each liquid path 84 connecting a common liquid chamber 83 and each discharge port 82. The ink jet head 13 may be of a configuration mounted on a carriage in such a positional relationship that the discharge ports 82 are arranged in a direction crossing the main scanning direction (moving direction of the head or the carriage). Thus the printing head 13 is so constructed as to activate (energize) the electrothermal converting members 85 based on the corresponding image signals or discharge signals to cause film boiling in the ink in the liquid paths 84, and to discharge the ink from the discharge ports 82 by thus generated pressure.

Figure 5:
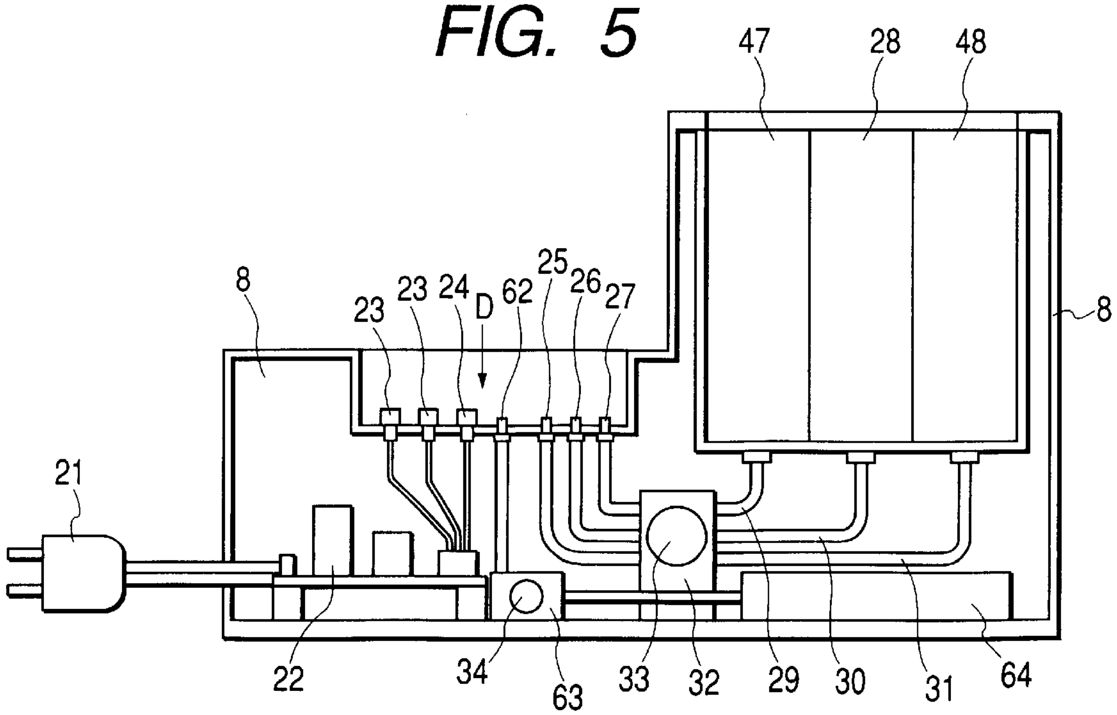
FIG. 5 is a schematic longitudinal cross-sectional view showing the internal configuration of a charging/ink-filling apparatus for charging the portable communication apparatus shown in FIG. 1 and filling ink therein.
Figure 6:
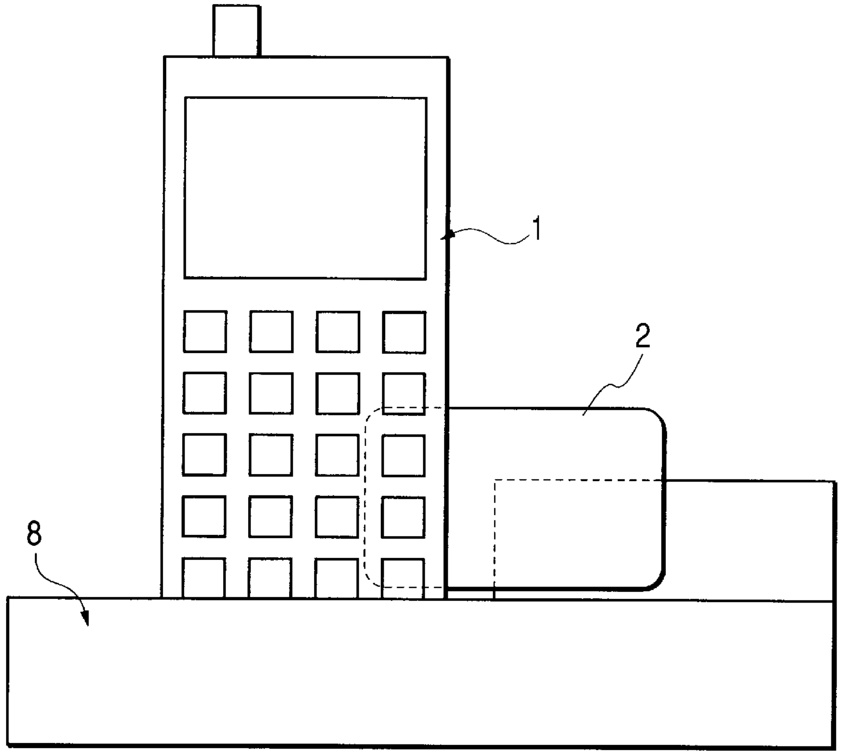
FIG. 6 is a schematic elevation view showing a state in which the portable communication apparatus is mounted on the charging/ink-filling apparatus and printing is executed while battery charging and ink filling are executed.

FIG. 5 is a schematic cross-sectional view showing the configuration of the charging/ink filling and collection apparatus 8, which has a function of supplying electric power to the portable telephone 1 thereby charging a battery thereof, a function of supplying (filling) a printing mechanism incorporated in the portable telephone 1 with ink, and a function of recovering waste ink stored in the portable telephone 1.

There are shown an AC plug 21 to be inserted into an AC receptacle, a charging/ink information processing circuit 22 for controlling the charging of the communication apparatus 1 and controlling a pump or the like for supplying the portable telephone 1 with ink, a power supply terminal 23 for electric power supply to the portable telephone 1, a communication terminal 24 for exchanging information with the portable telephone 1, a magenta ink terminal 25 for magenta ink supply to the portable telephone 1, a cyan ink terminal 26 for cyan ink supply to the portable telephone 1, a yellow ink terminal 27 for yellow ink supply to the portable telephone 1, a replaceable cyan ink tank 28 incorporated in the charging/ink-filling apparatus 8, a replaceable yellow ink tank 47 incorporated in the charging/ink-filling apparatus 8, a replaceable magenta ink tank 48 incorporated in the charging/ink-filling apparatus 8, an ink pump 32 driven by a pump motor 33 for sucking the ink in the ink tanks 28, 47, 48, through tubes 30, 29 and 21 respectively a waste ink pump 63 for discharging the waste ink, and a waste ink tank 64 for storing the waste ink.

In case of executing battery charging, ink filling and waste ink collection of the portable telephone 1, it is inserted (mounted) into the charging/ink filling and collection apparatus 8 from a direction D shown in FIG. 5. In response to such mounting, various operations are automatically executed to achieve battery charging, ink filling and waste ink collection.

In such operation, the ink is refilled with an amount corresponding to a number of recording sheets printable with a single charging in the printing operation utilizing the power supply in the portable telephone 1. Stated differently, the ink amount reservable in the portable telephone 1 can be selected equal to that corresponding to the number of recording sheets printable with a single charging. In practice, since the remaining battery capacity varies depending on the conversion or communication time, the printing operation can be executed without difficulty if ink is refilled in such an amount as to satisfy the maximum printing capacity at the maximum charged state. However, since there is required a large space for storing ink in such amount, the ink amount can be practically set in an amount capable of printing 5 to 10 recording sheets.

The ink amount can be made not excessive nor deficient for the printing not only by executing ink filling at the battery charging operation of the portable telephone but also by regulating the ink amount and the battery capacity in such a manner that the timing of battery charging matches the timing of ink filling.

Figure 8:
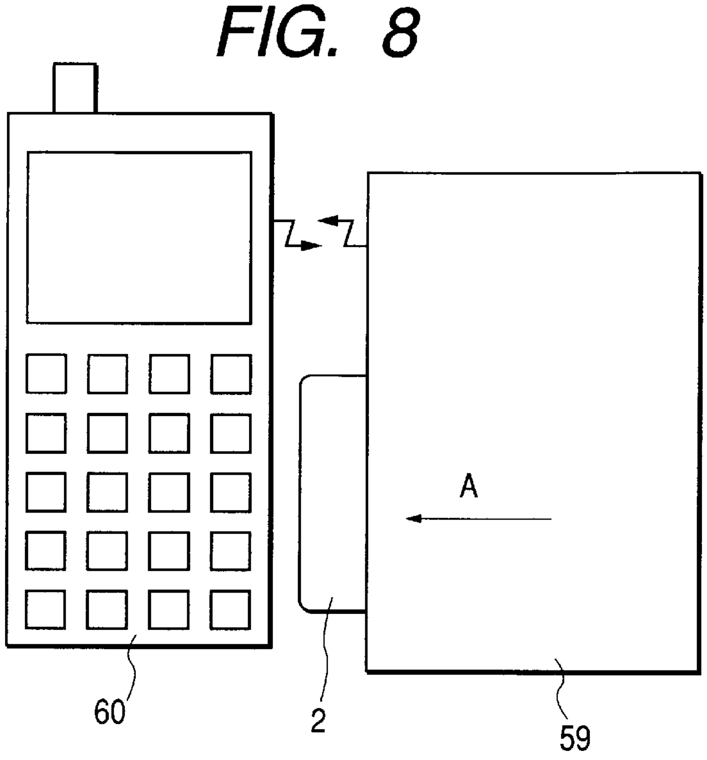
FIG. 8 is an elevation view schematically showing a state of executing printing under communication between a portable communication apparatus not provided with the printing mechanism and a portable printing apparatus.

If the relationship between the ink amount and the battery capacity is not considered, there can also be adopted a configuration in which the portable telephone 1 is mounted on the charging/ink filling and collection apparatus 8 as shown in FIG. 8 to execute printing while conducting battery charging, ink filling and waste ink collection at the same time. Thus, in case the portable telephone 1 is used outside home and becomes incapable of printing because of the deficiency of the ink held therein, it is inserted into the charging/ink-filling apparatus 8 when the user returns home whereby the portable telephone 1 communicates with the charging/ink-filling apparatus 8 to automatically enable printing.

Figure 7:
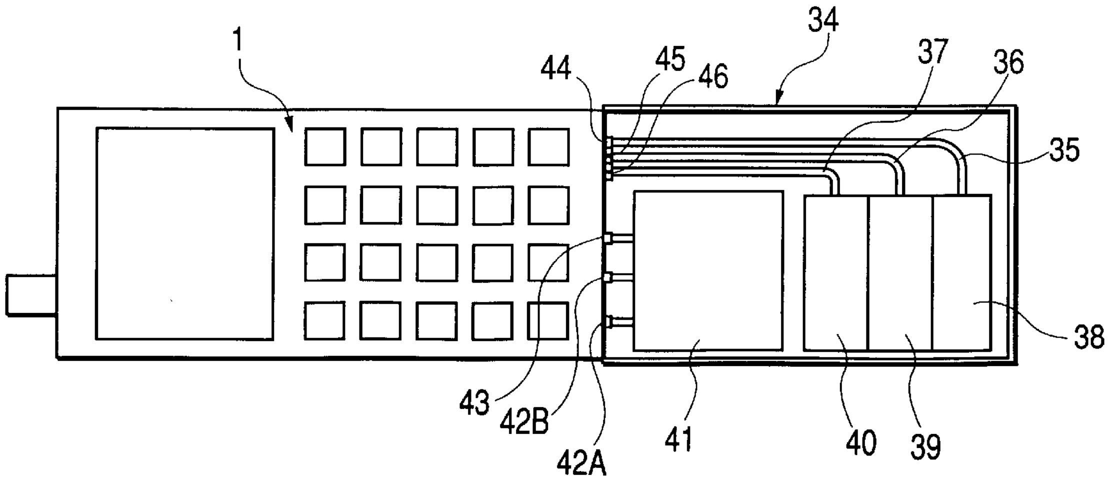
FIG. 7 is a partially cut-off elevation view schematically showing a state in which a portable power source/ink adaptor is connected to the portable communication apparatus shown in FIG. 1 and battery charging and ink filling are executed while it is carried.

FIG. 7 shows a configuration capable of responding to such situation where the ink is exhausted while the user is outside home. FIG. 7 is a partially cut-off elevation view schematically showing the configuration of a portable power-supply/ink adaptor 34 capable of battery charging and ink filling for the portable telephone 1 while outside home. In FIG. 7, there is shown a portable power-supply/ink adaptor 34 to be directly connected (directly inserted) to the portable telephone 1 for executing battery charging and ink filling to the portable telephone 1.

Such portable power-supply/ink adaptor 34 is equivalent to the charging/ink-filling apparatus 8 but formed as a portable type, and can be constantly coupled with the portable telephone 1. Thus, the "charging/ink-filling apparatus" in the present application includes such portable power-supply/ink adaptor. Though there is not illustrated a waste ink collection mechanism, but the presence of such mechanism as shown in FIG. 5 is naturally acceptable. However, in consideration of the fact that such configuration gives emphasis on the portability is used principally in an emergency situation, the presence of such waste ink collection mechanism is not essential.

In FIG. 7, there are shown a yellow ink terminal 44 on the adaptor 34 to be connected with the aforementioned yellow ink terminal 7 for yellow ink supply from the portable power-supply/ink adaptor 34 to the portable communication apparatus 1, a cyan ink terminal 45 on the adaptor 34 to be connected with the aforementioned cyan ink terminal 6 for cyan ink supply from the portable power-supply/ink adaptor 34 to the portable communication apparatus 1, and a magenta ink terminal 46 on the adaptor 34 to be connected with the aforementioned magenta ink terminal 5 for magenta ink supply from the portable power-supply/ink adaptor 34 to the portable communication apparatus 1.

There are also shown a magenta ink tank 40 incorporated in the portable power-supply/ink adaptor 34, a cyan ink tank 39 incorporated in the portable power-supply/ink adaptor 34, and a yellow ink tank 38 incorporated in the portable power-supply/ink adaptor 34.

There are also provided a yellow ink tube 35 connecting the yellow ink tank 38 and the yellow ink terminal 44, a cyan ink tube 36 connecting the cyan ink tank 39 and the cyan ink terminal 45, and a magenta ink tube 37 connecting the magenta ink tank 40 and the magenta ink terminal 46.

There is also provided a rechargeable battery (charging battery) 41 incorporated in the portable power-supply/ink adaptor 34 for electric power supply (charging) to the portable telephone 1.

There are further provided power source terminals 42A, 42B on the portable power-supply/ink adaptor 34 to be connected to the aforementioned power supply terminals 3, 3 for electric power supply to the portable telephone 1, and a communication terminal 43 on the portable power-supply/ink adaptor 34 to be connected with the aforementioned communication terminal 4 for information exchange with the portable telephone 1.

FIG. 8 shows another configuration in a state in which a communication apparatus 60 (portable telephone also in this example) without printing apparatus executes printing with a portable printing apparatus 59. The portable telephone 60 transmits image data by a wireless method or by infrared light to the portable printing apparatus 59 thereby executing printing. The portable printing apparatus 59 incorporates a battery and an ink tank (not shown).

Figure 9:
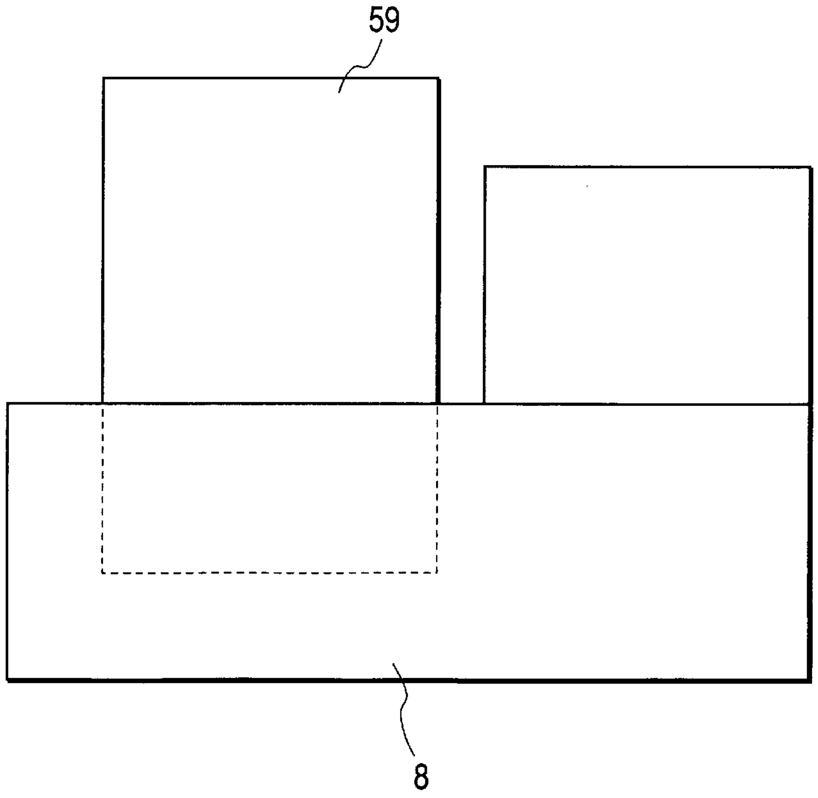
FIG. 9 is a schematic elevation view showing a state in which the portable printing apparatus shown in FIG. 8 is mounted on the charging/ink-filling apparatus shown in FIG. 5 for charging the portable printing apparatus and filling ink therein (replenishment)

FIG. 9 shows a state in which the portable printing apparatus 59 is inserted into the charging/ink-filling apparatus 8, thereby executing charging of the power source, ink filling and waste ink discharge at the same time. The portable printing apparatus 59 is provided with the power supply terminals, communication terminal ink terminals and waste ink terminal as in the portable telephone (portable electronic device) 1 and is formed with the same width and depth as those of the communication apparatus 1.

Figure 10:
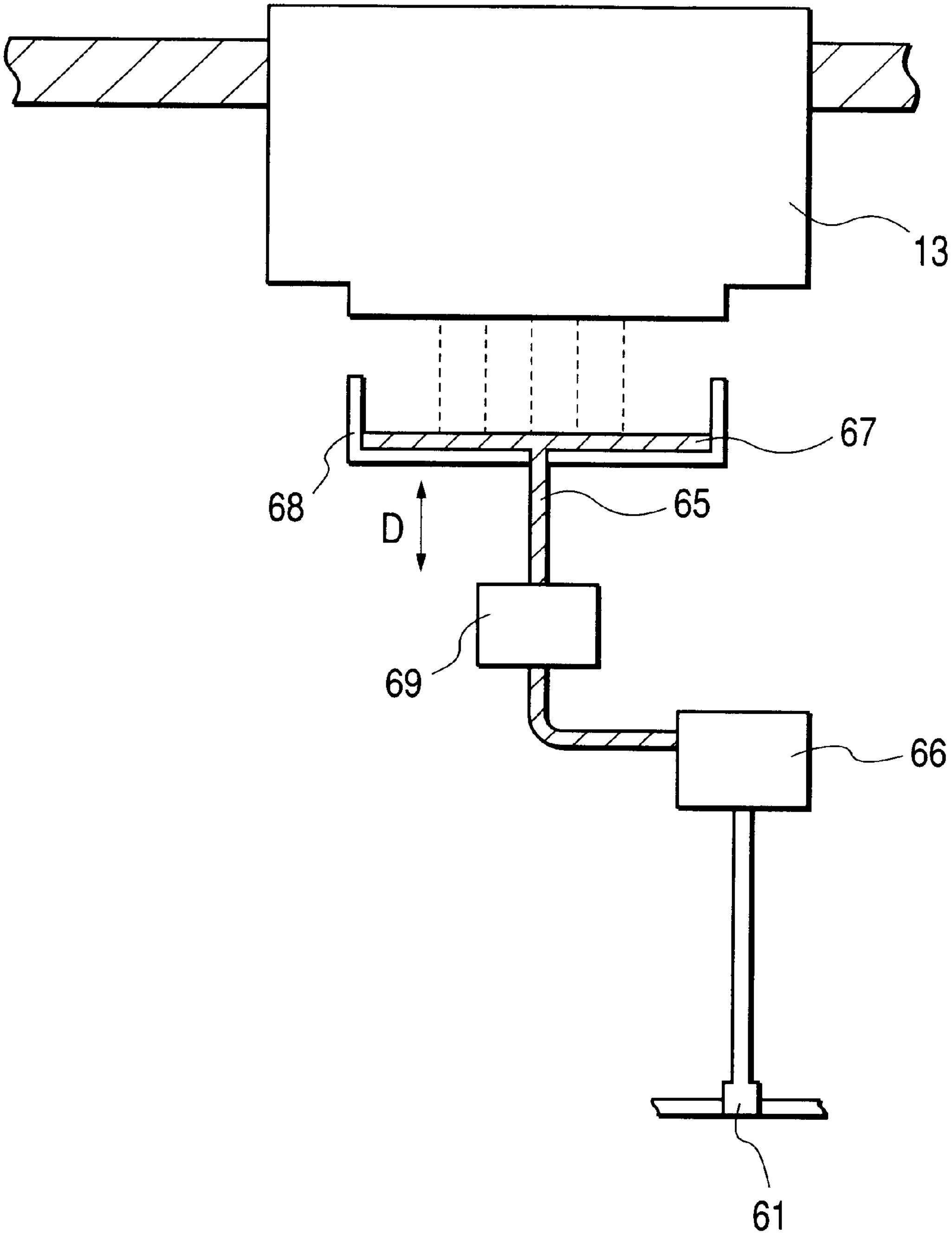
FIG. 10 is a schematic view showing the configuration of a head collection mechanism.
Figure 11:
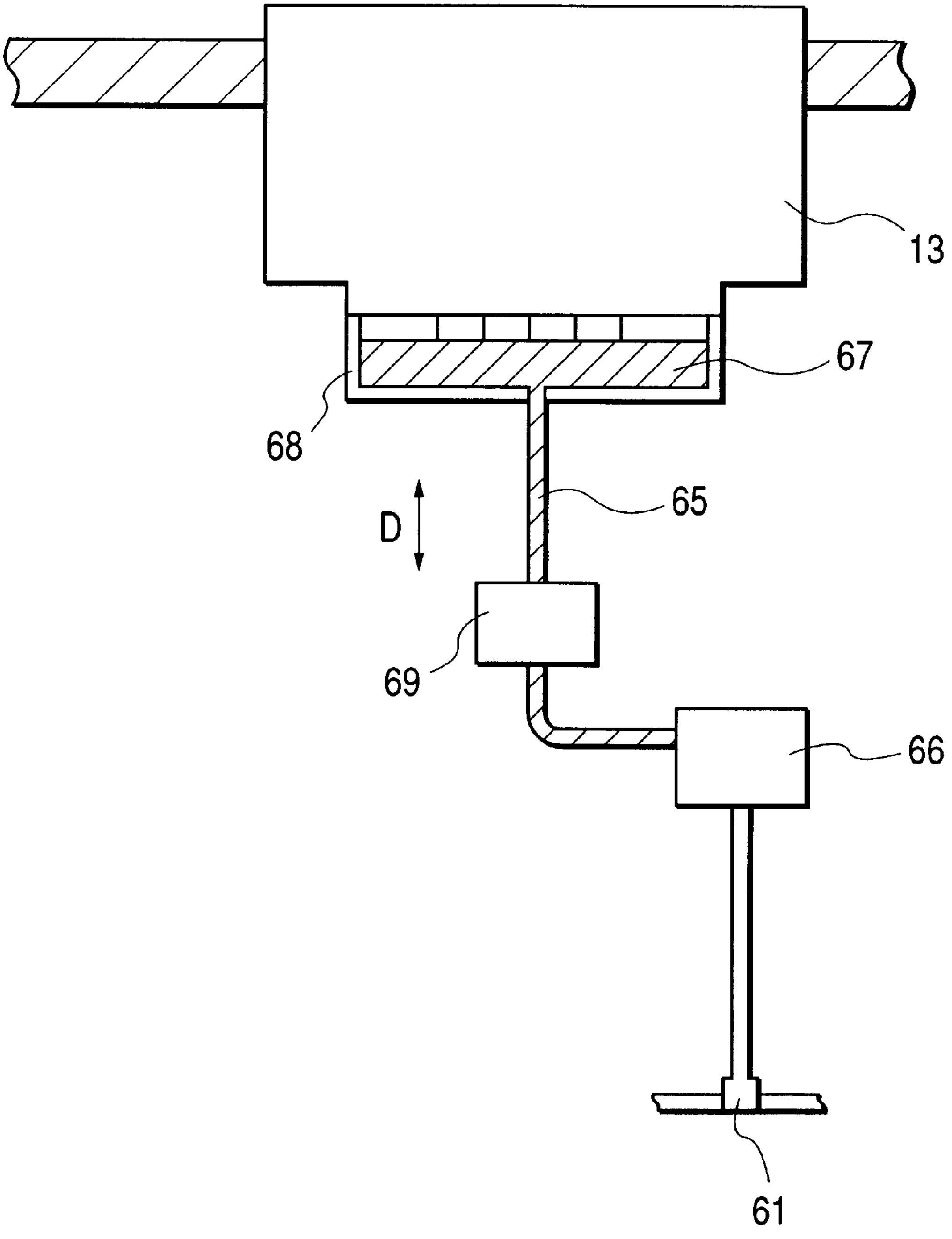
FIG. 11 is a schematic view showing the collection state of the head.

FIGS. 10 and 11 schematically show the configuration of the printing head around a recovery mechanism thereof.

In FIGS. 10 and 11, there are shown a waste ink tank 66 for retaining waste ink, waste ink 67, a cap 68 for capping the printing head 13, and a waste ink pump 69 for sucking the waste ink.

Referring to FIG. 10, the printing head 13 causes clogging of the discharge ports when the printing operation is repeated. Therefore, preliminary discharge (ink emission from the head) is executed in the position of the cap 68, displaced from the printing position, whereby the clogging of the printing head 13 is eliminated. The cap 68 is moved vertically in a direction D by unrepresented means. The waste ink 67 accumulated in the cap 68 is removed by the waste ink pump 69 through the waste ink tube 65, and is stored in the waste ink tank 66. The waste ink can be discharged to the exterior through the waste ink terminal 61.

FIG. 11 shows a state for recovering the clogging of the printing head 13, in which the cap 68 is moved in the direction D and is brought into contact with the printing head 13, the ink in the printing head 13 is sucked by the waste ink pump 69, and the waste ink is stored in the waste ink tank 66 through the waste ink tube 65. The waste ink in the waste ink tank 66 is discharged to the exterior through the waste ink terminal 61 when the main body is inserted into the charging/ink-filling apparatus 8.

Figure 12A:
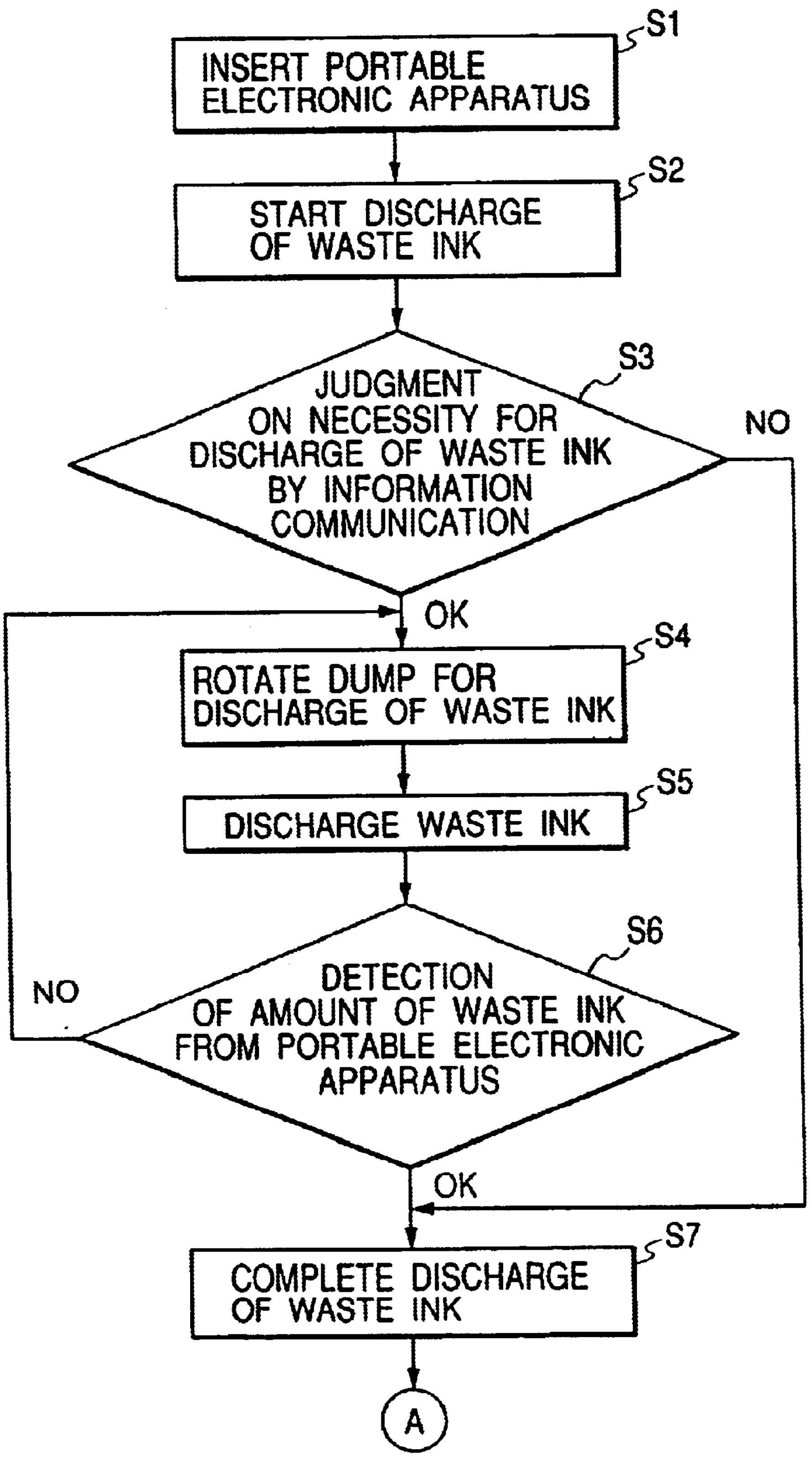
FIGS. 12A, 12B and 12C are flow charts showing the operation sequence of battery charging, ink filling and waste ink collection for the portable communication apparatus of the present invention such as a portable telephone.
Figure 12B:
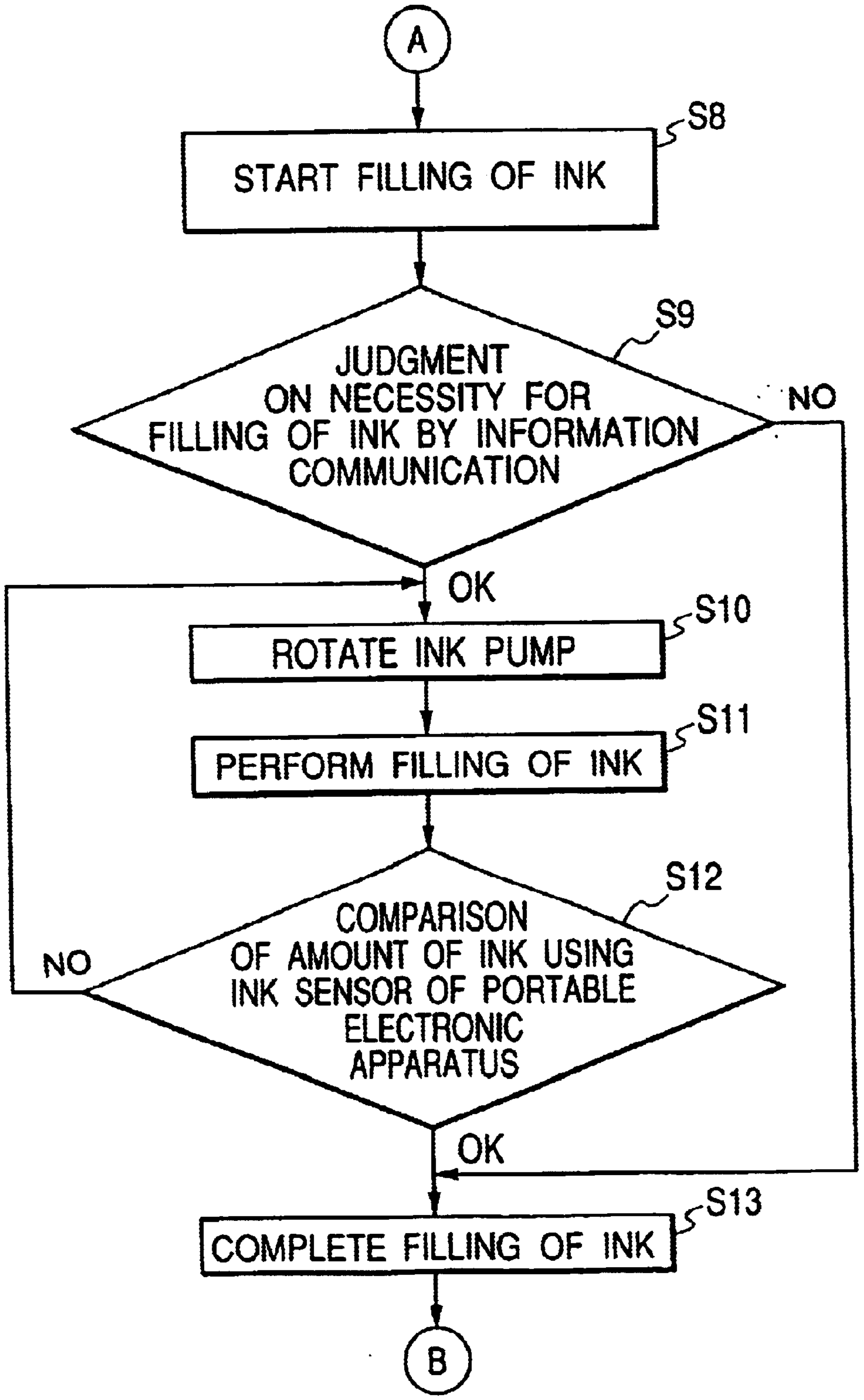
Figure 12C:
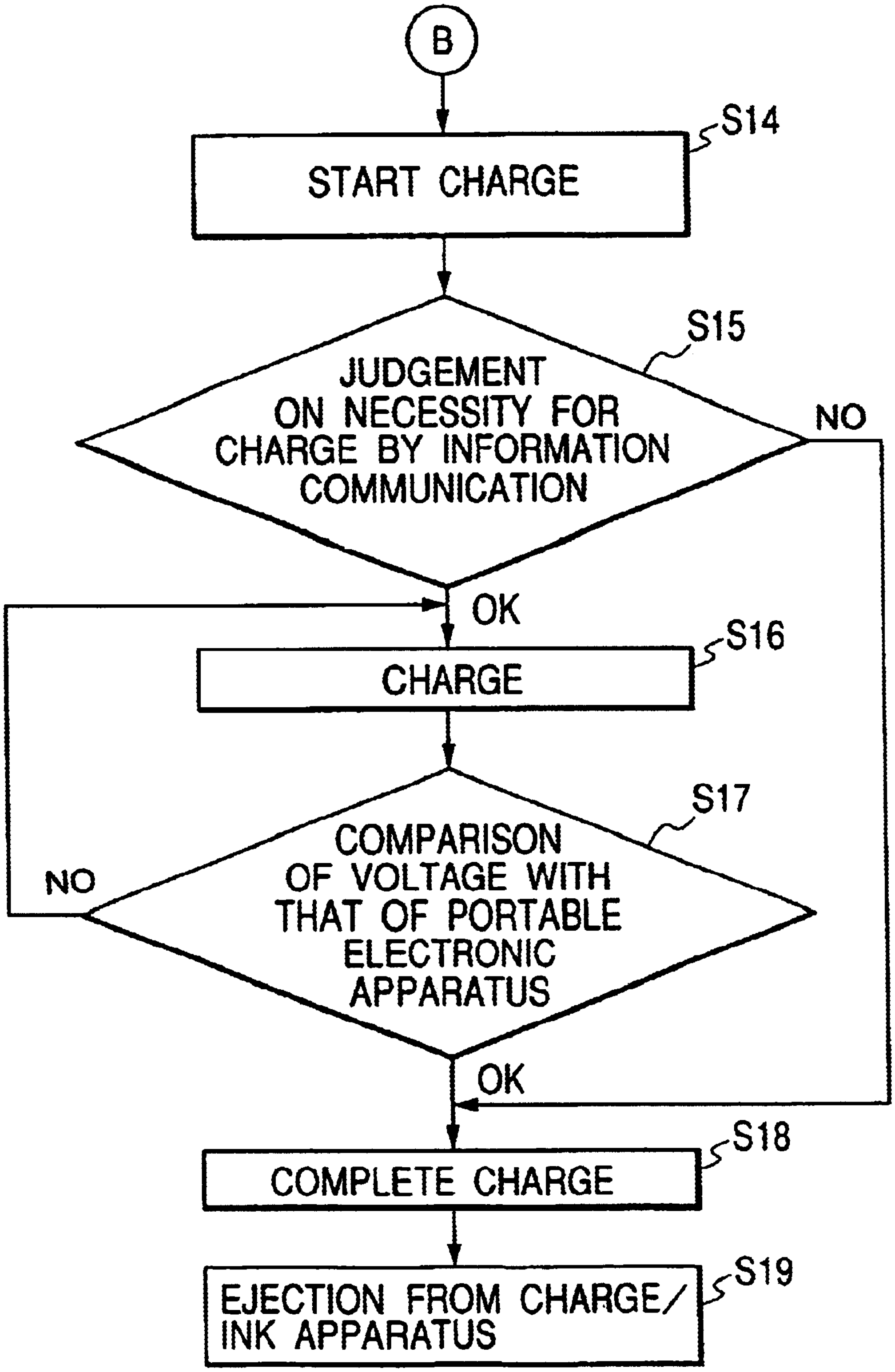

FIGS. 12A, 12B and 12C are flow charts showing the process of replenishment of printing ink, battery charging and waste ink discharge.

When the portable communication apparatus (portable telephone) 1 of the present invention is inserted into the charging/ink-filling apparatus in step S1 in FIG. 12A, step S2 initiates a waste ink discharging process. Step S3 discriminates, by information communication, whether the discharge of the waste ink is necessary, and, if judged necessary, step S4 rotates the waste ink pump 63 of the charging/ink-filling apparatus 8. Then step S5 discharges the waste ink into the waste ink tank 64. Then step S6 detects the amount of the waste ink by an unrepresented sensor of the portable communication apparatus 1, and, if further disposal of the waste ink is unnecessary, step S7 terminates the waste ink discharging operation.

If the step S6 identifies that further discharge of the waste ink is necessary, the sequence returns to the steps S4 and S5 to continue the rotation of the waste ink pump 63 thereby continuing the discharge of the waste ink.

Then step S8 initiates ink filling. When the ink filling process is initiated, step S9 discriminates by information communication whether the ink filling is necessary, and, if judged necessary, step S10 rotates the ink pump 32, then step S11 executes ink filling (replenishment) into the ink tanks 15, 16, 17 of the portable communication apparatus 1, and step S12 detects the ink amount by an unrepresented ink sensor of the portable communication apparatus 1 thereby judging whether sufficient filling has been executed, and, if it is judged that the ink of a sufficient amount has been refilled, the sequence proceeds to step S14 to complete the ink filling operation.

If the step S9 identifies that the ink filling is unnecessary, the sequence proceeds to the step S13 to complete the ink filling operation.

On the other hand, if the step S12 identifies that sufficient ink filling has not been executed, the sequence returns to the step S10, S11 to continue the rotation of the ink pump 32, thereby continuing the ink filling (replenishment).

Then step S14 initiates charging. When the charging process is initiated, the sequence proceeds to step S15 to discriminates by information communication whether the charging is necessary, and, if judged necessary, step S16 executes charging of the power source. Then step S17 executes comparison with the voltage of the portable communication apparatus 1, and, if the voltage is judged to have reached a sufficient value, step S18 terminates the charging operation.

If the step S15 identifies that the charging is unnecessary, the sequence proceeds to step S18 to terminate the charging process.

On the other hand, if the step S17 identifies that the voltage has not reached a sufficient value, the sequence returns to the step S16 to continue the charging operation.

Thereafter, in step S19, the portable communication apparatus 1 is taken out from the charging/ink-filling apparatus 8 whereupon the process is terminated.

In the foregoing embodiment, the portable communication apparatus 1 is inserted into the apparatus 8 having the functions of battery charging, ink filling and waste ink discharge and the processes of such functions are executed in succession, but the sequence may be so constructed as to execute these operations in parallel.

Also the sequence of the present invention is not limited to that shown in FIGS. 12A, 12B and 12C.

For example, in case the portable communication apparatus is inserted into an apparatus having at least one of the functions of battery charging, ink filling and waste ink discharge, there may be executed a process corresponding to such function. As an example, the present invention also includes a case where the portable communication apparatus is inserted into an apparatus having the ink filling function only, whereupon the portable communication apparatus executes the ink filling operation and therefore does not execute the battery charging and the waste ink discharge. In such case, in the flow chart shown in FIGS. 12A, 12B and 12C, there may be provided at first a process of discriminating the functions of the apparatus into which the portable communication apparatus is inserted and there may be only executed the functions held by the aforementioned apparatus, or the functions to be executed may be determined by inquiring the functions of the aforementioned apparatus by information communication from the portable communication apparatus.

Figure 13:
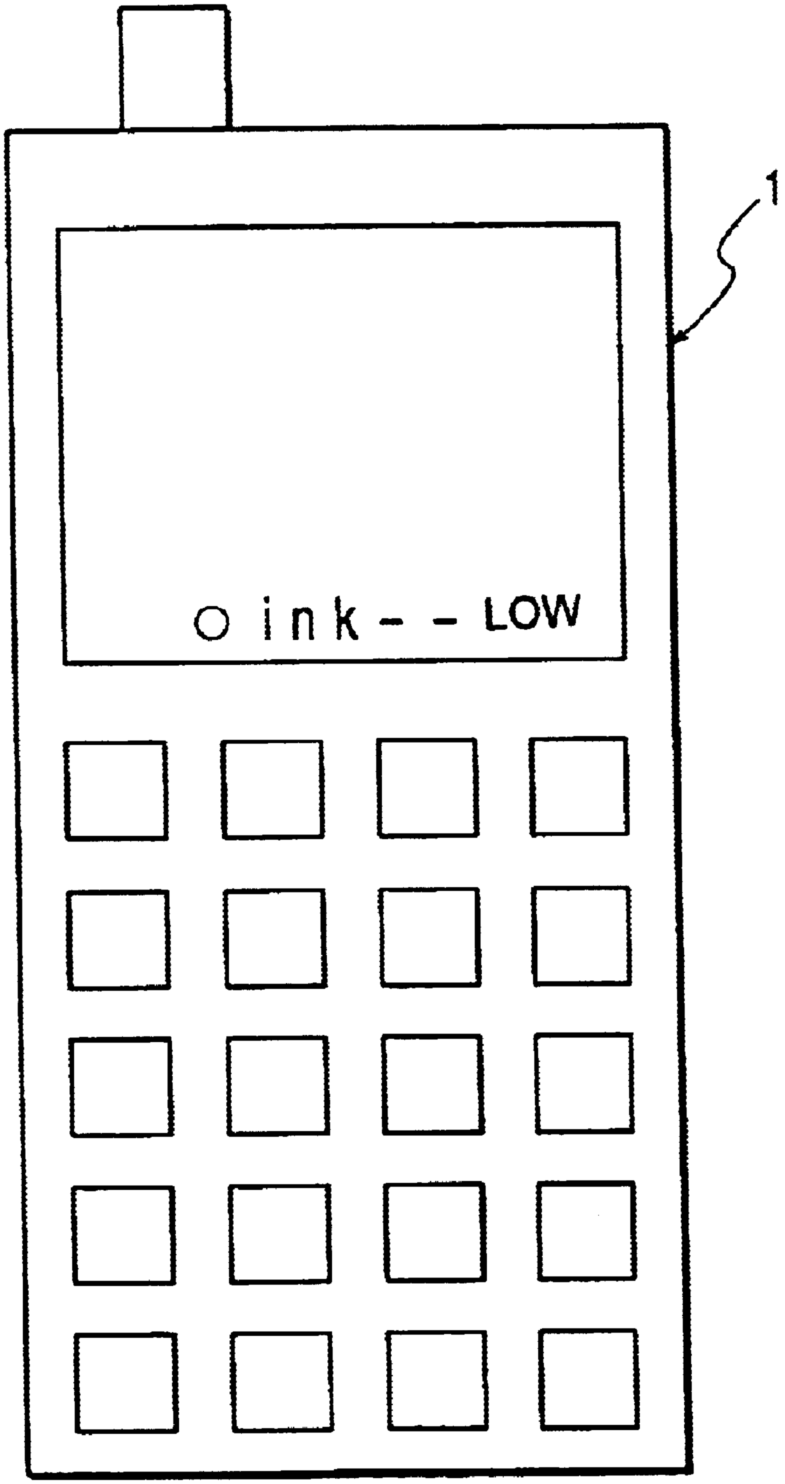
FIG. 13 is a schematic elevation view showing a state where an alarm for the remaining ink amount is displayed on a display unit when the ink amount in the portable communication apparatus becomes less.

FIG. 13 is a schematic elevation view showing a state of displaying an alarm for the remaining ink amount on a display unit when the ink amount becomes low in the portable communication apparatus (portable telephone) 1. Referring to FIG. 13, the display unit of the portable telephone incorporating the printing mechanism is capable of displaying that the remaining amount of the ink in the portable telephone has become low or displaying the current amount of ink present in the portable telephone.

The alarm for the remaining ink amount is not limited to the display shown in FIG. 13, but there may also be adopted a method of generating vibration by a vibrator incorporated in the portable telephone 1 or of giving an acoustic message by activating a sound generating device.

As explained in the foregoing embodiments, the portable communication apparatus 1 incorporating the printing mechanism is so constructed as to simultaneously execute the ink filling into the printing mechanism and the collection of waste ink at the battery charging of the portable communication apparatus, whereby provided is a portable communication apparatus capable of compactizing the ink tanks (intermediate tank, ink reservoir and waste ink reservoir) in the portable communication apparatus 1, also incorporating the printing mechanism in the portable communication apparatus 1 such as a portable telephone, and easily and promptly printing the image data.

Also since there is adopted a configuration of executing the charging of the portable communication apparatus 1 and the ink filling of the printing mechanism by the charging/ink-filling apparatus 8 consisting of a charging stand provided with the ink filling function, a configuration of executing the printing operation by attaching a media pack 49 incorporating the printing sheet 2 and the ink, or a configuration in which the portable communication apparatus is a portable telephone provided with information processing function, there can be provided a portable communication apparatus capable of compactizing the ink tanks (intermediate tank and ink reservoir) held therein, incorporating the printing mechanism in the portable communication apparatus such as a portable telephone and easily and promptly printing the image data.

Also the portable printing apparatus 59 capable of printing the information of the portable communication apparatus 60 by communication therewith is so constructed as to simultaneously execute the ink filling of the portable printing apparatus 59 at the charging operation thereof, whereby there can be provided a portable printing apparatus capable of compactizing the ink tanks (intermediate tank and ink reservoir) held therein, and easily and promptly printing the image data by combined use with the portable communication apparatus 1 such as a portable telephone.

Thus, according to the foregoing embodiments, the portable communication apparatus 1 incorporating the printing mechanism is so constructed as to simultaneously execute battery charging and ink filling thereof, there can be obtained an effect of minimizing the ink reservoir of the printing mechanism in the portable communication apparatus such as a portable telephone, also thus easily incorporating the printing mechanism and easily and promptly printing the image contained in the portable communication apparatus.

Also in case of printing an image of the portable communication apparatus such as a portable telephone, there is not required the very inconvenient and cumbersome conventional procedure of transferring the image once to the provider and printing the image by accessing to the provider by a computer after returning to home, so that the image data incorporated in the portable communication apparatus can be printed on the spot outside home easily and promptly. After returning to home, the battery charging and ink filling of the portable communication apparatus can be executed by merely inserting it in the charging/ink-filling apparatus, whereby the convenience of use can be significantly improved.

Also the present invention can be arbitrarily exploited regardless of the number of the printing head, and is likewise applicable not only to a printing mechanism employing a single printing head but also to a printing mechanism employing plural printing heads to achieve similar results, and such cases are also included in the present invention.

Also with respect to the inks employed in the printing, there can be utilized monochromatic printing employing a single color ink such as a black ink, color printing employing inks of different colors, gradational printing employing inks of different densities in the same color, or a combination thereof, and the present invention is likewise applicable to the configurations employing such various printing mechanism to achieve similar effects, and such case are also included in the present invention.

Furthermore the present invention is likewise applicable to any configuration of the printing head and the ink reservoir in the printing mechanism, such as a configuration employing a replaceable head cartridge integrally including the printing head and the ink reservoir or a configuration in which the printing head and the ink reservoir are formed separately and are mutually connected by a tube or the like, to obtain similar effects, and such cases are also included in the present invention.

Furthermore, the present invention is also applicable to a case where the printing mechanism is of ink jet recording type, such as employing a printing head of ink jet recording method utilizing an electromechanical converting element such as a piezo element, but provides an excellent effect in case of employing a printing mechanism utilizing a printing head for discharging ink by thermal energy, because, in such method, there can be achieved high density and high definition in the printing.

As explained in the foregoing, in the portable electronic apparatus incorporating the printing mechanism, by executing the filling of the ink tank and the discharge of waste ink at the battery charging of such apparatus, it is rendered possible to compactize the ink tank held therein and to incorporate the printing apparatus in the portable electronic apparatus. Also in case of printing the image of the portable electronic apparatus, there is not required the very inconvenient conventional procedure of once transferring the image to the provider and accessing to the provider by the computer after returning home for printing the image by the printer, but the image can be printed on the spot whereby the convenience of use can be significantly improved. Also in the portable electronic apparatus incorporating the printing apparatus, by displaying an alarm for the remaining ink amount, there can be utilized the portable charging/ink-filling adaptor whenever necessary to achieve battery charging, ink filling and waste ink discharge at any time. Also after returning home, the battery charging, ink filling and waste ink discharge are made possible by merely inserting the apparatus into the charging/ink-filling apparatus.

As explained in the foregoing, the invention of claim 1 provides a portable communication apparatus incorporating a printing mechanism, so constructed as to execute the ink filling of the printing mechanism simultaneously with the charging of the portable communication apparatus, thereby enabling to compactize the ink reservoir in the portable communication apparatus, to easily and simply incorporate the printing mechanism in the portable communication apparatus and to easily and promptly print the data stored therein.

Also the inventions of claims 2 to 4 provide, in addition to the configuration according to claim 1, a configuration of executing the charging of the portable communication apparatus 1 and the ink filling of the printing mechanism by a charging/ink-filling apparatus consisting of a charging stand provided with the ink filling function, a configuration of executing the printing operation by attaching a media pack incorporating the recording medium and the ink, and a configuration in which the portable communication apparatus is a portable telephone provided with an information processing function, whereby it is rendered more efficiently possible to compactize the ink reservoir in the portable communication apparatus, to easily and simply incorporate the printing mechanism in the portable communication apparatus such as a portable telephone and to easily and promptly print the data stored therein.

The inventions of claims 5 to 7 provide, in addition to the configurations of the foregoing claims, a configuration where the printing mechanism is of an ink jet method of printing on the recording medium by discharging ink, a configuration in which the printing mechanism utilizes for printing an ink jet head provided with an electrothermal converting member for generating thermal energy to be utilized for ink discharge, and a configuration in which the ink jet head discharges ink utilizing film boiling generated in the ink by the thermal energy generated by the electrothermal converting member, thereby providing a portable communication apparatus capable of efficiently attaining the aforementioned effects.

The invention further provides, in addition to the configurations of the foregoing claims, a configuration of displaying the remaining ink amount, a configuration of displaying that the remaining ink amount has become low, a configuration of giving information by vibration that the remaining amount of the printing ink has become low, a configuration of giving voice information that the remaining amount of the printing ink has become low, and a configuration of discharging the waste ink to the exterior in synchronization or non-synchronization with the ink filling, thereby providing a portable communication apparatus allowing to easily and exactly recognize the timing of battery charging and ink filling in addition to the aforementioned effects, thereby further improving the operability.

Also the invention further provides a portable printing apparatus capable of printing information of a portable communication apparatus by communication therewith, so constructed as to execute ink filling of the portable printing apparatus simultaneously with the battery charging thereof, thereby providing a portable printing apparatus capable of minimizing the ink tank incorporated therein and easily and simply printing the data stored in the portable communication apparatus even while it is carried.

The invention further provides, a configuration of executing the battery charging and the ink filling of the portable printing apparatus by a charging/ink-filling apparatus consisting of a charging stand provided with the ink filling function, and a configuration in which the portable communication apparatus is a portable telephone provided with information processing function, thereby providing a portable printing apparatus capable of more efficiently minimizing the ink tank in the portable printing apparatus, and easily and promptly printing the data stored in the portable communication apparatus.

The invention further provides, a configuration including a printing mechanism of an ink jet method for printing on the recording medium by discharging ink, a configuration of executing communication with the portable communication apparatus by wireless communication means and a configuration of executing communication with the portable communication apparatus by infrared communication means, thereby providing a portable printing apparatus allowing to easily and exactly recognize the timing of battery charging and ink filling in addition to the aforementioned effects, thereby further improving the operability.

What is claimed is:

1. A portable electronic device system comprising:

a portable electronic device having an information input portion, an information informing portion, a rechargeable battery, an ink jet head, an ink holding portion for holding ink to be supplied to the head, and a waste ink storing portion for storing waste ink that has not been used in recording and has been discharged from the head;

a retaining apparatus having a mount portion for mounting of the portable electronic device thereon, said retaining apparatus further having a charging mechanism for charging the battery, an ink tank for replenishing the ink holding portion with ink, and a waste ink collecting portion for collecting the waste ink;

wherein said portable electronic device is constructed to conduct printing on a supplied paper sheet either while mounted or not mounted to said retaining apparatus, and wherein while said portable electronic device is mounted to said retaining apparatus, the rechargeable battery is connected to the charging mechanism to conduct battery charging, the ink holding portion is connected to the ink tank to conduct ink replenishment, and the waste ink storing portion is connected to the waste ink collecting portion to conduct waste ink collection.

2. The portable electronic device system according to claim 1, wherein said portable electronic device is a portable telephone or a personal digital assistant (PDA).

3. The portable electronic device system according to claim 1, wherein the information informing portion is a display, a speaker, or a vibrator.

4. The portable electronic device system according to claim 3, wherein it is informed by vibration that the remaining amount of printing ink has become low.

5. The portable electronic device system according to claim 3, wherein it is informed by sound that the remaining amount of printing ink has become low.

6. The portable electronic device system according to claim 1, wherein the information informing portion is adapted to display the remaining amount of printing ink on said display.

7. The portable electronic device system according to claim 6, wherein the display indicates that the remaining amount of printing ink has become low.

8. The portable printing apparatus according to claim 1, wherein communication with said portable electronic device is executed by a wireless communication means.

9. The portable printing apparatus according to claim 1, wherein communication with said portable electronic device is executed by an infrared communication means.

* * * * *